UNITED STATES PATENT OFFICE.

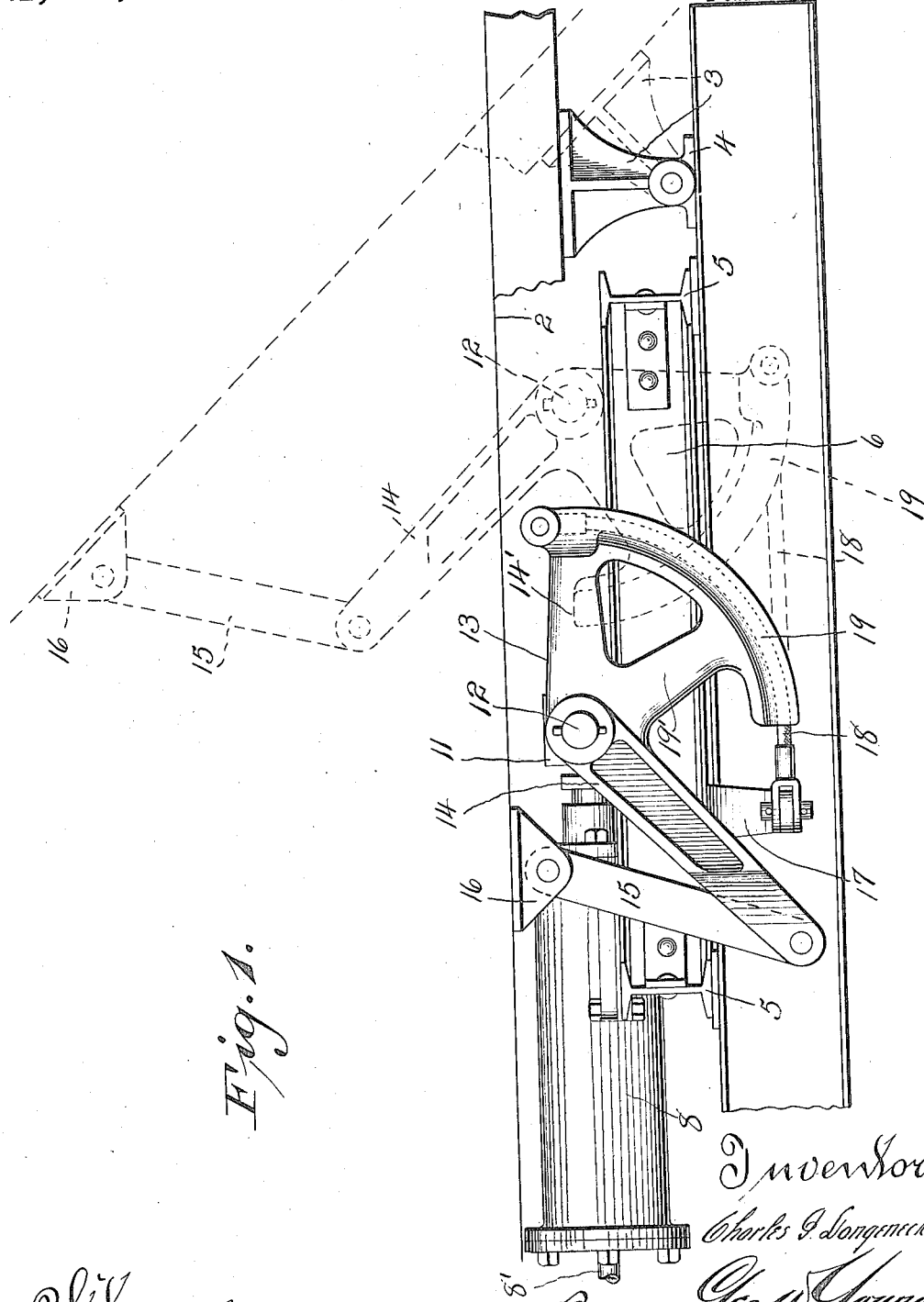

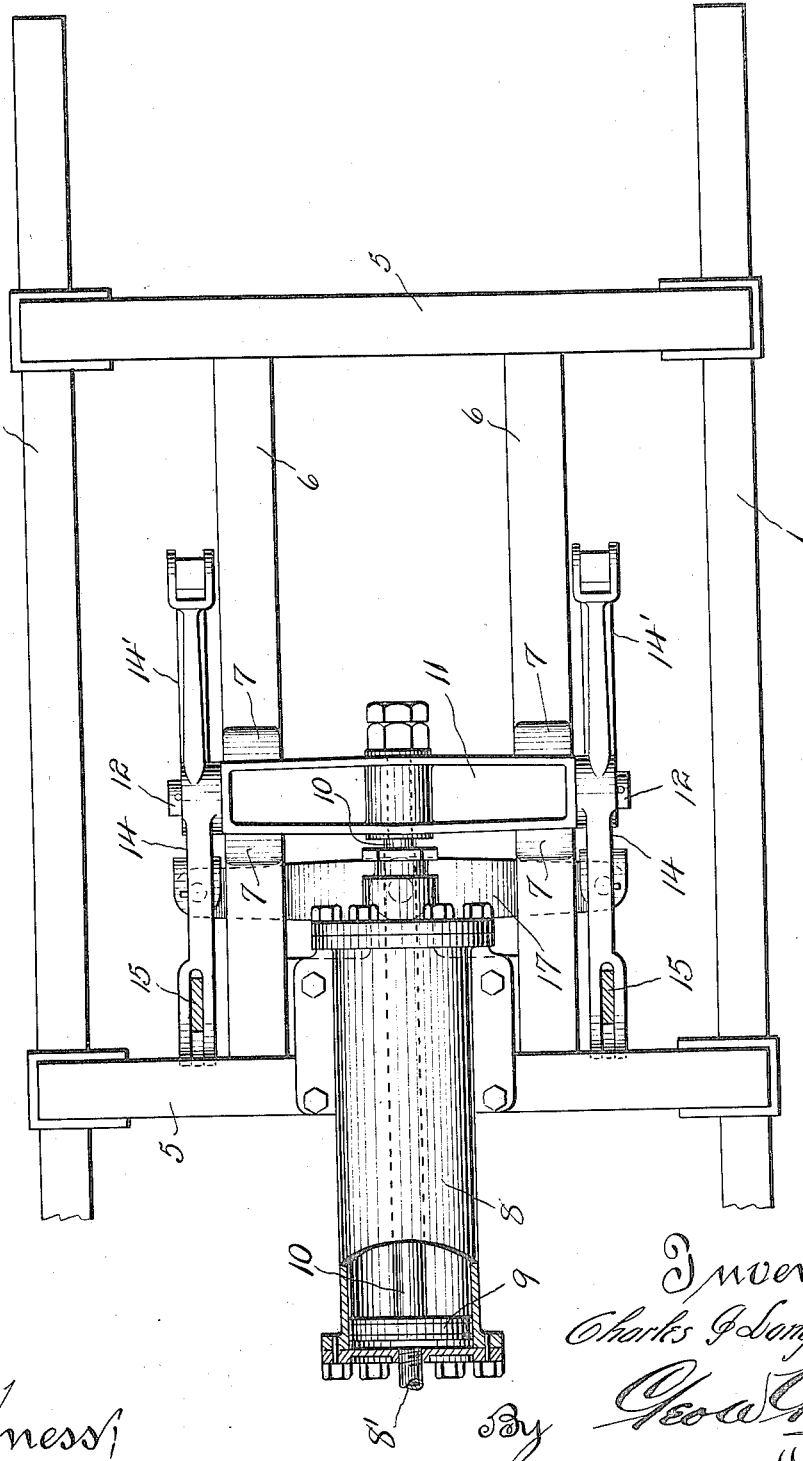

CHARLES I. LONGENECKER, OF MILWAUKEE, WISCONSIN.

END-DUMP TRUCK.

1,260,559.

Specification of Letters Patent.  Patented Mar. 26, 1918.

Application filed June 8, 1917. Serial No. 173,506.

*To all whom it may concern:*

Be it known that I, CHARLES I. LONGE-NECKER, a citizen of the United States, and resident of Milwaukee, in the county of Milwaukee and State of Wisconsin, have invented certain new and useful Improvements in End-Dump Trucks; and I do hereby declare that the following is a full, clear, and exact description thereof.

My present invention relates to means for tilting the dump bodies of ordinary dump vehicles such as that shown in my co-pending application, Serial No. 171,104, filed May 26, 1917, wherein is also shown the structure described and claimed in this application.

The principal object of this invention is to provide means for use in connection with a fluid piston for tilting the vehicle body which is normally pivoted to the vehicle frame.

In dump vehicles of ordinary construction, which are at present in common use, it is customary to elevate the dump receptacle or body by applying the power at a fixed point to raise one end, the other end being pivoted, and the elevating mechanism is fixedly connected with the end which is to be raised. It is obvious that as the body or receptacle is tilted, its center of gravity is gradually being brought nearer to a vertical plane passing through the pivot which connects the receptacle with the vehicle frame, thus the force necessary to tilt the parts is continuously decreasing. Hence, the vehicles which are at present in use, are so constructed that the same amount of force is continuously being applied during the complete raising of the dump body, although the actual force necessary is continuously lessening.

In providing means for shifting the point of application of the power for raising one end of the dump body as the center of gravity changes, such power may be maintained approximately constant with respect to the continuously decreasing force necessary for tilting the dump body. In the present invention this change in the point of application of power is provided by moving the elevating mechanism toward the pivotal connection between the dump body and its frame. This also maintains the point of application substantially beneath the center of gravity of the dump body throughout its tilting movement.

With this and many other objects and advantages in view the invention resides in the novel combination and arrangement of parts which will be hereinafter more particularly described and claimed.

In the accompanying drawings:

Figure 1 represents a side elevation of a portion of a vehicle frame having a portion of a dump receptacle pivoted thereto which is designed to be tilted by my improved mechanism, said receptacle and tilting mechanism being shown in operating position in dotted lines, and Fig. 2 is a detail plan view of the parts shown in Fig. 1 after the removal of the dump receptacle.

In this application only so much of a vehicle frame and dump receptacle have been illustrated as is required to show the application of my invention thereto. Reference may be had to the above mentioned co-pending application for an examination of a complete dump truck provided with similar mechanism. In the drawings herewith the numeral 1 designates the side bars of an ordinary vehicle frame and 2 designates the dump receptacle of any ordinary or preferred design, the latter having depending hinge members 3 which coöperate with similar members 4 on the side bars to thereby pivot the receptacle and vehicle frame together. In end dump trucks this pivotal connection is adjacent the end of the vehicle frame. It is obvious that a similar mechanism to that shown could readily be used in side dump trucks.

Disposed transversely of the side bars 1 and forwardly of the pivotal connection between the body 2 and frame are a pair of spaced cross I-beams 5, which rest on the flanges of the side bars 1 and are secured thereto. These beams are adapted to support a pair of spaced longitudinally extending beams 6 whose upper surfaces form tracks on which a pair of shoes 7 slide. Also mounted on one of the beams 5, preferably the forward one, is a compressed fluid cylinder 8 which, in the present instance is disposed horizontally and longitudinally of the vehicle frame. The cylinder 8 contains a piston head 9 mounted on a piston rod 10, as shown in Fig. 2, the outer end of the piston rod being connected with a cross head 11 which is connected with the shoes 7, said shoes and cross head preferably being cast integrally.

From each of the shoes 7 extends outwardly a stub shaft 12 on which is pivoted intermediate its ends a lifting lever 13 which includes a pair of arms 14 and 14'. The arms 14 have their free ends bifurcated and receive links 15, the same being pivoted thereto at one end, their opposite ends being similarly connected to brackets 16 on the bottom of the dump receptacle 2.

Pivoted intermediate its ends to a plate carried by one of the beams 5 is an equalizing bar 17 whose ends extend beyond the tracks 6 in alinement with the arms of the levers 13. These ends of the equalizing bar are connected with the ends of the arms 14' by flexible members such as cables 18. Connected with each of the arms 14' is a sector 19, in the grooves of which the cables 18 rest when the parts are in inactive position and during the rocking of the levers 13. This maintains the cables 18 substantially the same distance from the fulcrum point of the levers 13 at all times inasmuch as the sectors are arcs with the stub shafts 12 as their centers. The ends of the sectors remote from their connection with the arms 14' are spaced from the arms 14, but are rigidly connected with the levers 13 adjacent these ends by bracing arms 19'.

The operation of this invention, while clearly shown in the figures of the drawing, may be briefly described as follows:

Assuming that the parts are in lowered inactive position as in full lines in Fig. 1, compressed fluid is conveyed into the cylinder 8 through the pipe 8', whereby the piston head 9 is forced toward the right-hand end thereof to move the cross head 11. Such movement also necessarily causes the shoes 7 to slide rearwardly on the tracks 6 to move the fulcrum point of the levers 13 toward the pivotal connection between the dump receptacle and vehicle frame, as shown in dotted lines in Fig. 1. The levers are caused to simultaneously rock about their pivots inasmuch as the end of the arms 14' thereof are connected to a relatively stationary portion of the vehicle frame. Such rocking movement of the levers raises the ends of the arms 14 and elevates the forward end of the dump receptacle. The shifting of the fulcrum points of the levers permits the dump receptacle to be tilted to a greater degree in proportion to stroke of the piston, than if such movement did not take place, as is very obvious from the drawings. The entrance of compressed fluid into the cylinder 8 continues until the vehicle dump receptacle has been elevated a sufficient amount, whereupon the control mechanism shown in the above mentioned co-pending application is actuated to discontinue the flow of fluid. When it is necessary to lower the dump receptacle, said control mechanism is operated to allow the compressed fluid to flow from the cylinder 8, whereupon the receptacle 2 will be lowered by the action of gravity.

I claim:

1. In a mechanism of the class described, a body frame, a dump receptacle pivoted thereto, a fulcrum block, a lever non-shiftably pivoted intermediate its ends on said fulcrum block, a connection between one end of the lever and the receptacle, a non-lengthening and non-shortening connection between the other end of the lever and the frame, and means for moving the fulcrum block to rock the lever and tilt the receptacle.

2. In a mechanism of the class described, a body frame, a dump receptacle pivoted thereto, a fulcrum block, a lever non-shiftably pivoted intermediate its ends to said block, a connection between one end of the lever and the receptacle, an attaching member on the frame, means for connecting the other end of the lever to the attaching member, and means for moving the fulcrum block away from said attaching member whereby to rock the lever and tilt the receptacle.

3. In a mechanism of the class described, a body frame, a dump receptacle pivoted thereto, a fulcrum block, a lever non-shiftably pivoted intermediate its ends to said block, a connection between one end of the lever and the receptacle, an attaching member on the frame, a non-extensible and non-contractile flexible connection between the other ends of the lever and the attaching member, and means for moving the fulcrum block away from said attaching member whereby to rock the lever and tilt the receptacle.

4. In a mechanism of the class described, a body frame, a dump receptacle pivoted thereto, a pair of spaced tracks on the frame, a pair of shoes movable along said tracks, a cross head connecting the shoes, a lever pivoted intermediate its ends to each of said shoes, a connection between one end of each lever and the receptacle, a non-extensible and non-contractile connection between the other end of each lever and the frame, and means for moving the cross head whereby to rock the levers and tilt the receptacle.

5. In a mechanism of the class described, a body frame, a dump receptacle pivoted thereto, a pair of levers slidably fulcrumed on the body frame, a connection between one end of each lever and the receptacle, an equalizing bar pivoted to the body frame, a flexible connection between the other end of each lever and the ends of the equalizing bar, and means for moving the fulcrum points of said levers.

6. In a mechanism of the class described, a body frame, a dump receptacle pivoted thereto, a pair of levers slidably fulcrumed on the body frame, a connection between one end of each lever and the receptacle, an equalizing bar pivoted to the body frame, a non-extensible and non-contractile connection between the other end of each lever and the ends of the equalizing bar, and means for moving the fulcrum points of the levers away from said equalizing bar, whereby to rock the levers and the receptacle.

In testimony that I claim the foregoing I have hereunto set my hand at Milwaukee, in the county of Milwaukee and State of Wisconsin.

CHARLES I. LONGENECKER.